Aug. 2, 1932.　　　　M. KIND　　　　1,869,970
APPARATUS FOR HANDLING CEMENT OR LIKE MATERIAL IN BULK
Filed Jan. 17, 1930　　2 Sheets-Sheet 1
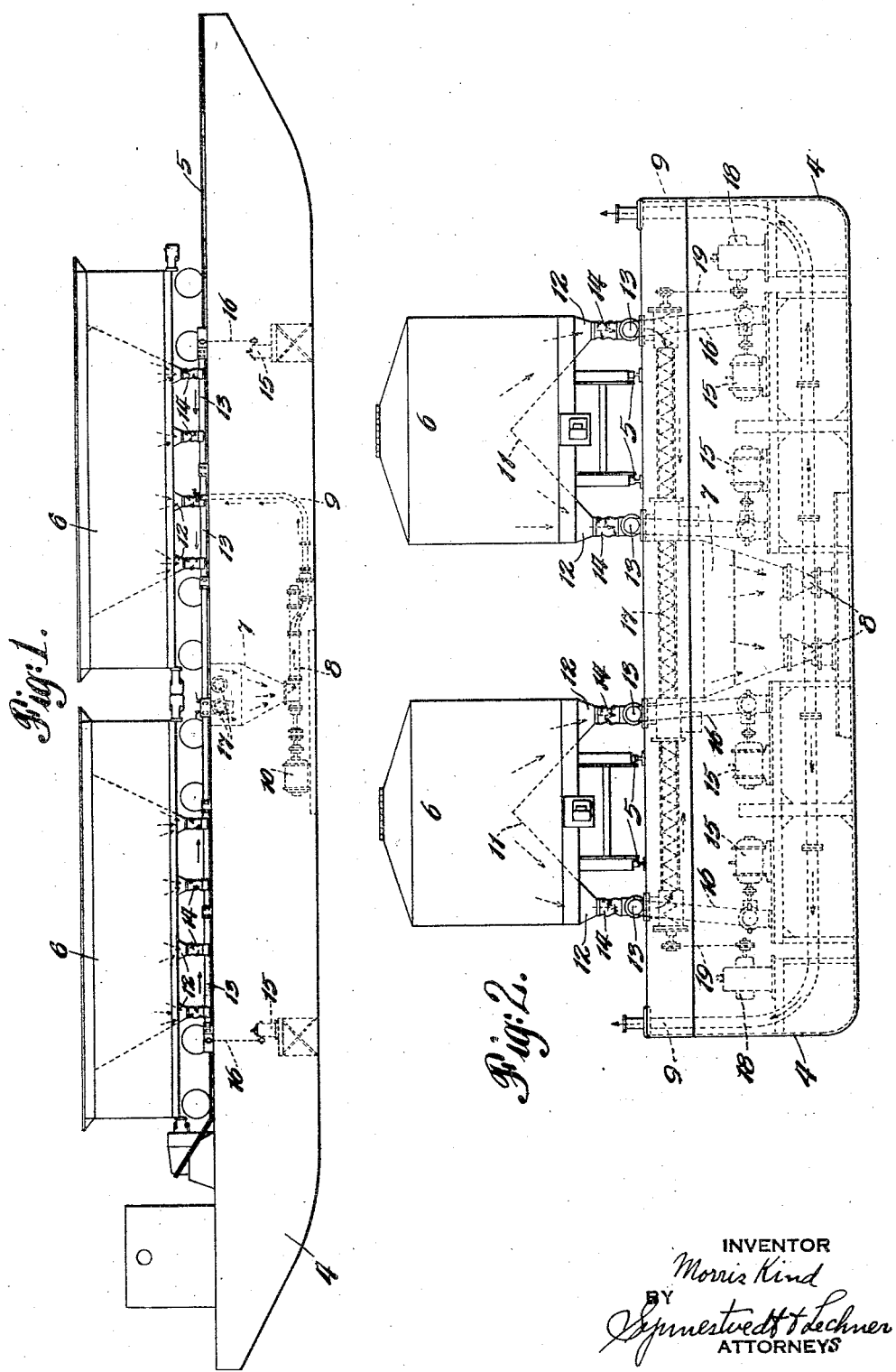
INVENTOR
Morris Kind
BY
Synnestvedt & Lechner
ATTORNEYS

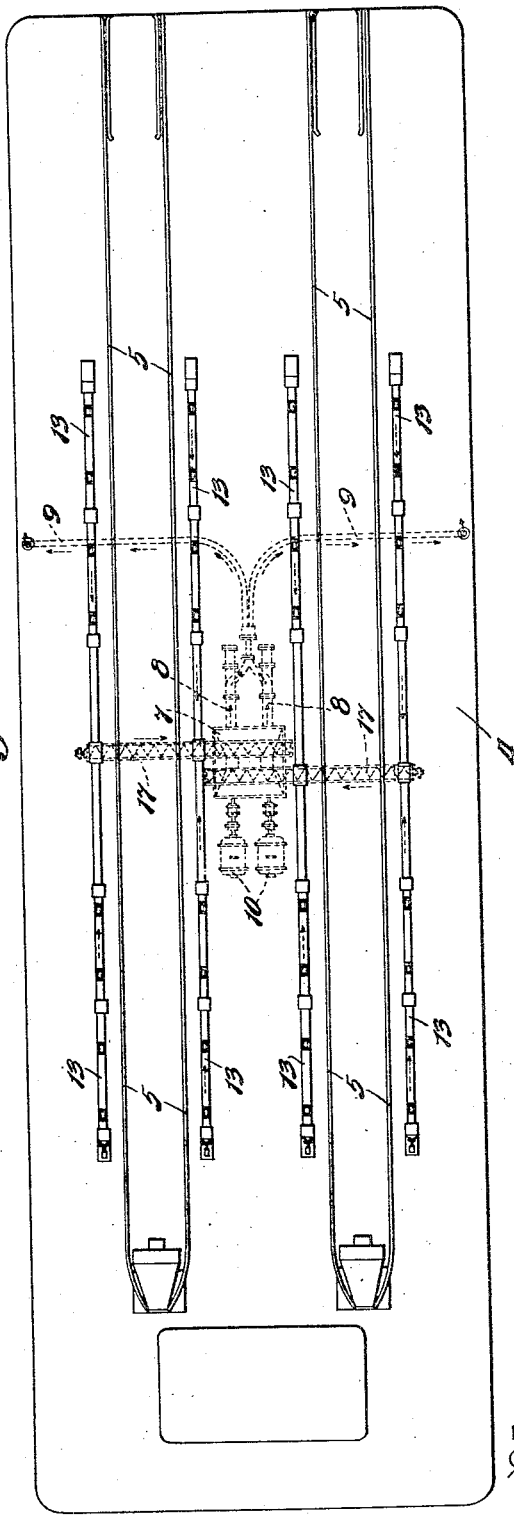

Patented Aug. 2, 1932

1,869,970

UNITED STATES PATENT OFFICE

MORRIS KIND, OF BRYN MAWR, PENNSYLVANIA, ASSIGNOR TO HERCULES CEMENT CORPORATION, OF PHILADELPHIA, PENNSYLVANIA, A CORPORATION OF PENNSYLVANIA

APPARATUS FOR HANDLING CEMENT OR LIKE MATERIAL IN BULK

Application filed January 17, 1930. Serial No. 421,332.

This invention relates to apparatus for handling cement or like material in bulk and is particularly concerned with the provision of a float or barge for handling carload lots of such material in harbors or on rivers or like places.

The principal object of the invention is to provide a float for handling cars of the material which includes all necessary equipment for removing the material from the cars and discharging it from the float so as to obviate the necessity for providing separate or independent unloading mechanism at every point where material is to be delivered.

A further object of the invention is to provide a float for the purpose indicated which is arranged to remove the cement from the cars substantially uniformly so as not to disturb the trimming of the float due to unequal removal of the load from various locations on the float. In connection with this object it is a further object of the invention to collect the material from the cars at a common collection point and then to withdraw it from this point of collection and discharge it from the float.

Another object of the invention is to provide means for discharging the material downwardly at each side of the track upon which the cars are run and to collect this material in longitudinal conveyors, which, in turn, empty into a transverse conveyor below the track adapted to carry the material to a common collecting bin or other suitable receptacle, from which latter point suitable conveying mechanism withdraws the material and discharges it from the float.

Among the incidental objects of the invention are the provision of a float by means of which it is possible to handle cars of bulk material of the character described, with much less expense and in considerably less time while at the same time fully protecting it from the elements.

This, together with such other objects as may appear hereinafter, or are incident to my invention, I attain by means of a construction which is illustrated in the preferred form in the accompanying drawings, wherein—

Fig. 1 is a side elevation of my improved barge with the cars in position.

Fig. 2 is an end elevation of Fig. 1, and

Fig. 3 is a plan view with the cars removed.

Examination of the drawings will show that the barge 4 is provided with a pair of parallel trackways 5. However, it is not necessary to limit the invention to the use of two tracks, as more or less can be used as desired, although I prefer to arrange the tracks in multiples of two, because this arrangement lends itself more easily to maintaining the barge in proper trim during the unloading operation.

I prefer to make the barge sufficiently long to receive at least two cars 6 on each track. In approximately the center of the barge between the tracks I provide a common collection means in the shape of a suitable bin or hopper 7 which extends downwardly into the hold of the barge and discharges near the bottom into the conveying mechanisms 8, two of which, in the present instance, I have illustrated. Although it is not essential, I prefer to adopt for these mechanisms 8 some suitable type of air transport mechanism. These deliver into the conduits 9 by means of which the material is discharged from the float, to a suitable pipe line on shore delivering to storage bins, connection being made to the barge by a hose and provision being made for rise and fall of the barge. Motors 10 are provided for operating the discharging conveying mechanism.

The cars 6 are constructed with a central upstanding ridge 11, (see Fig. 2) so that downwardly discharging hoppers 12 are formed at either side of the car. In the present instance there are four of these hoppers 12 on each side of each car and they are arranged to deliver into the longitudinal conveyors 13, connection between the bottom of each hopper and the respective entrances to the conveyors being made by means of a flexible tube 14 made preferably of waterproofed canvas.

The conveyors 13 are of the screw type and I provide one at each side of each car arranged longitudinally of the track. Each conveyor 13 is driven in any desired manner, as by a motor 15 and a chain 16 and four of the conveyors (those at the left in Fig. 3) revolve in one direction so as to carry the material toward the center of the float, and the other four (those at the right in Fig. 3) in the opposite direction in order to carry the material toward the center of the float.

At approximately the center of the float I provide a transverse conveyor 17 under each track and the longitudinal conveyors discharge into the transverse conveyors. The transverse conveyors are driven by a motor 18 and a chain 19.

Each transverse conveyor 17, of course, is of sufficient capacity and is operated at sufficient speed to take care of all of the discharge from the four longitudinal conveyors associated with its track and both transverse conveyors are arranged to discharge into the collection bin 7.

The direction of the flow of the material in the various mechanisms is indicated by the arrows.

It will be seen, therefore, that I have provided a float for handling cars of bulk cement or like material in which it is possible to unload the material without the necessity of providing separate unloading apparatus at each point of delivery, the float, as it were, being a completely self-contained or self-sufficient unit. The only thing that it is necessary to do is to plug the motors into any suitable source of current at the pier where unloading takes place or provide a power unit on the barge for supplying such power. The unloading can be accomplished from all of the cars evenly so as not to interfere with the trim of the barge and the collection point is so centrally located as also to interfere as little as possible with the trimming of the float. The flexible tubes 14 permit the body of the cars to rise as the load in the cars is reduced and yet at no time is there any crack or opening in the connection between the hoppers 12 and the longitudinal conveyors 13 so that no dust can escape, and no water enter. Unloading can be accomplished with ease and rapidity and with a minimum of expense per pound of material handled.

I claim:—

1. Apparatus for handling cement or like material in bulk comprising in combination, a float, a track, a car discharging downwardly at each side of the track, a longitudinal screw conveyor arranged substantially in the plane of the track at each side thereof for receiving the discharge from the car, flexible, water-proof connecting means for delivering the discharge from the car into the longitudinal conveyors, a transverse screw conveyor below the track receiving from said longitudinal conveyors and discharging into a receiving bin, and conveying mechanism for withdrawing the material from said bin and discharging it from the float.

2. Apparatus for handling cement or like material in bulk comprising in combination, a float, a track, a car discharging downwardly at a plurality of separated points, screw conveying mechanism arranged substantially in the plane of the track and having a plurality of inlets for receiving such discharge and delivering the material to a point of collection, flexible connecting means for delivering the discharge from the car into said inlets, and conveying mechanism for withdrawing the material from said collection point and discharging it from the float.

3. Apparatus for handling cement or like material in bulk comprising in combination, a float, a pair of tracks extending longitudinally of the float adapted to carry a plurality of cars of material, a material collecting bin below the tracks, enclosed conveying mechanism arranged substantially in the plane of the track for transferring the material from the cars to the bin, enclosed flexible conduit means for connecting the cars to said conveying mechanism, and conveying mechanism for withdrawing the material from the bin and discharging it from the float.

4. Apparatus for handling cement or like material in bulk comprising in combination, a float, a pair of tracks extending longitudinally of the float adapted to carry a plurality of cars of material, said cars being adapted to discharge downwardly, a material collecting bin below the tracks, longitudinally extending conveying mechanism arranged in substantially in the plane of the track for receiving the discharge from the cars, enclosed flexible conduit means for delivering the discharge from the cars into said longitudinal conveying mechanism, transversely extending conveying mechanism receiving from said longitudinal mechanism and delivering to said bin, and a third conveying mechanism for withdrawing the material from said bin and discharging it from the float.

5. A float for handling cars of bulk cement or like material, said float having a plurality of tracks, a longitudinal screw conveyor at each track arranged substantially in the plane thereof and adapted to receive material from the cars on said track, enclosed flexible conduit means for delivering the material from the cars to said longitudinal screw conveyors, a transverse screw conveyor beneath each track receiving the discharge from said longitudinal conveyor, a collecting bin receiving the discharge from said transverse conveyors, and conveying mechanism for withdrawing the material from said bin and discharging it from the float.

6. A float for handling cars of bulk cement or like material, said float having a pair of tracks extending longitudinally thereof, a longitudinal screw conveyor arranged substantially in the plane thereof and adapted to receive material from the cars, enclosed flexible conduit means for delivering the material from the cars to said longitudinal screw conveyor, a transverse screw conveyor beneath said longitudinal conveyor receiving the discharge therefrom, a collecting bin below said tracks below said conveyors adapted to receive the discharge from said transverse conveyor, and conveying mechanism for withdrawing the material from said bin and discharging it from the float.

7. A float for handling cars of bulk cement or like material, said float having a track for carrying a plurality of cars of material, said cars being adapted to discharge downwardly at each side of the track, a longitudinal screw conveyor at each side of each car arranged substantially in the plane of the track for receiving material therefrom and carrying it toward a common collection point, enclosed flexible conduit means for delivering the discharge from the cars into said longitudinal conveyors, a transverse screw conveyor under the track for receiving the material from said longitudinal conveyors, a collection bin for receiving the discharge from said transverse conveyor, and conveying mechanism for withdrawing the material from said bin and discharging it from the float.

8. A float for handling cars of bulk cement or like material, said float having a plurality of tracks, a longitudinal screw conveyor at each track arranged substantially in the plane thereof and adapted to receive material from the cars on said track, enclosed flexible conduit means for delivering the material from the cars into said longitudinal screw conveyor, a transverse screw conveyor beneath each track receiving the discharge from said longitudinal conveyor and a collecting bin receiving the discharge from said transverse conveyors.

9. A float for handling cars of bulk cement or like material, said float having a pair of tracks extending longitudinally thereof, a longitudinal screw conveyor arranged substantially in the plane of the track and adapted to receive material from the cars, enclosed flexible conduit means for delivering the material from the cars into said longitudinal screw conveyor, a transverse screw conveyor beneath said longitudinal conveyor receiving the discharge therefrom and a collecting bin below said tracks and below said conveyors adapted to receive the discharge from said transverse conveyor.

10. A float for handling cars of bulk cement or like material, said float having a track for carrying a plurality of cars of material, said cars being adapted to discharge downwardly at each side of the track, an enclosed longitudinal conveyor at each side of each car arranged substantially in the plane of the track for receiving material therefrom and carrying it toward a common collection point, enclosed flexible conduit means for delivering the discharge from the cars into said longitudinal conveyors, an enclosed transverse conveyor under the track for receiving the material from said longitudinal conveyors and a collection bin for receiving the discharge from said transverse conveyor.

11. A float for handling cars of bulk cement or like material, said float having a plurality of tracks each adapted to carry a plurality of cars, an enclosed longitudinal conveyor for each car arranged substantially in the plane of the tracks, enclosed flexible conduit means for delivering the discharge from the cars into said longitudinal conveyors, an enclosed transverse conveyor for each track adapted to receive the discharge from all of the longitudinal conveyors along its track, and a collecting bin for receiving the discharge from said transverse conveyors.

12. A float for handling cars of bulk cement or like material, said float having a plurality of tracks each adapted to carry a plurality of cars, an enclosed longitudinal conveyor for each car arranged substantially in the plane of the tracks, enclosed flexible conduit means for delivering the discharge from the cars into said longitudinal conveyors, an enclosed transverse conveyor for each track adapted to receive the discharge from all of the longitudinal conveyors along its track, a collecting bin for receiving the discharge from said transverse conveyors and conveying mechanism for withdrawing the material from said bin and discharging it from the float.

13. Apparatus for handling and transporting cement or like material in bulk comprising in combination, a float having a pair of parallel tracks for the accommodation of railroad freight cars having hopper means discharging downwardly at a plurality of separated points along the track, a substantially centrally located receiving bin, longitudinal conveying mechanism along the tracks for receiving the discharge from the cars and arranged to carry the material from the ends toward the center of the float, transverse conveying mechanism for receiving the discharge from said longitudinal conveying mechanisms and delivering it to said receiving bin, and conveying means for withdrawing the material from said bin and discharging it from the float.

14. Apparatus for handling and transporting cement or like material in bulk including in combination, a float having a track, a car having a plurality of hoppers discharging downwardly at a plurality of separated points along the track, closed conveyor means disposed substantially in the plane of the track and provided with a plurality of inlets adapted to receive the discharge from said hoppers, enclosed, flexible conduit means for coupling the hopper outlets to the conveyor inlets, a collecting bin for receiving the discharge from said conveyor means, and conveying mechanism for withdrawing the material from said bin and discharging it from the float.

15. Apparatus for handling and transporting cement or like material in bulk including in combination, a float having a track, a car having a plurality of hoppers discharging downwardly at a plurality of separated points along the track, closed conveyor means disposed substantially in the plane of the track and provided with a plurality of inlets adapted to receive the discharge from said hoppers, enclosed flexible conduit means for coupling the hopper outlets to the conveyor inlets, and a collection bin for receiving the discharge from said conveyor means.

16. Apparatus for handling and transporting cement or like material in bulk including in combination, a float having railroad trackage thereon, a car having a plurality of hoppers discharging downwardly at a plurality of separated points along the track, a collection bin located substantially centrally of said float, enclosed conveying mechanism disposed substantially in the plane of the track and adapted to receive the discharge from said car, enclosed flexible conduit means for delivering the discharge from the car into said conveying mechanism, said conveying mechanism being adapted to discharge into said bin, and conveying mechanism for withdrawing the material from said bin and discharging it from the float.

17. Apparatus for handling and transporting cement or like material in bulk comprising in combination, a float carrying trackage for the accommodation of railroad freight cars having hopper means discharging downwardly at a plurality of separated points along the track, conveying mechanism disposed substantially in the plane of the trackage for receiving the discharge from the cars and arranged to carry the material from the ends toward the center of the float, a receiving bin for the material located substantially centrally of the float, and conveying means for withdrawing the material from the bin and discharging it from the float.

In testimony whereof I have hereunto signed my name.

MORRIS KIND.